(12) United States Patent
Kim et al.

(10) Patent No.: US 11,192,334 B2
(45) Date of Patent: *Dec. 7, 2021

(54) DECORATIVE MEMBER AND METHOD FOR PREPARING SAME

(71) Applicant: LG CHEM, LTD., Seoul (KR)

(72) Inventors: Yong Chan Kim, Daejeon (KR); Ki Hwan Kim, Daejeon (KR); Jeong Woo Shon, Daejeon (KR); Song Ho Jang, Daejeon (KR); Pilsung Jo, Daejeon (KR); Nansra Heo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/626,481

(22) PCT Filed: Jun. 27, 2018

(86) PCT No.: PCT/KR2018/007278
§ 371 (c)(1),
(2) Date: Dec. 24, 2019

(87) PCT Pub. No.: WO2019/004722
PCT Pub. Date: Jan. 3, 2019

(65) Prior Publication Data
US 2020/0114621 A1     Apr. 16, 2020

(30) Foreign Application Priority Data

Jun. 27, 2017 (KR) .................. 10-2017-0081427
Oct. 20, 2017 (KR) .................. 10-2017-0136834

(51) Int. Cl.
*B32B 3/00* (2006.01)
*B32B 7/023* (2019.01)
*B32B 3/30* (2006.01)

(52) U.S. Cl.
CPC .............. *B32B 7/023* (2019.01); *B32B 3/30* (2013.01); *B32B 2451/00* (2013.01); *Y10T 428/24917* (2015.01)

(58) Field of Classification Search
None
See application file for complete search history.

(56) References Cited

U.S. PATENT DOCUMENTS 6,104,530 A     8/2000  Okamura et al.
6,111,697 A *   8/2000  Merrill .................. G02B 5/305
                                          359/487.02
(Continued)

FOREIGN PATENT DOCUMENTS

CN   2056903 U    5/1990
CN   1462237 A   12/2003
(Continued)

OTHER PUBLICATIONS

Mokrzycki et al., "Color difference Delta E—A survey", Machine Graphics and Vision, pp. 1-28 (Apr. 2011).

(Continued)

*Primary Examiner* — Seth Dumbris
(74) *Attorney, Agent, or Firm* — Dentons US LLP

(57) ABSTRACT

The present disclosure relates to a decoration element comprising a light reflective layer; and a light absorbing layer provided on the light reflective layer, wherein the light reflective layer has surface resistance of 20 ohm/square or less.

13 Claims, 13 Drawing Sheets

(56) References Cited

U.S. PATENT DOCUMENTS

| | | | |
|---|---|---|---|
| 7,005,189 B1 * | 2/2006 | Tachibana | C03C 17/3618 |
| | | | 428/432 |
| 10,073,572 B2 | 9/2018 | Lim et al. | |
| 2001/0053028 A1 | 12/2001 | Kumazawa et al. | |
| 2003/0176124 A1 | 9/2003 | Koike et al. | |
| 2005/0181531 A1 * | 8/2005 | Kamiya | H01Q 1/3233 |
| | | | 438/66 |
| 2008/0150148 A1 * | 6/2008 | Frey | H05K 3/184 |
| | | | 257/769 |
| 2010/0060987 A1 | 3/2010 | Witzman et al. | |
| 2010/0207842 A1 * | 8/2010 | Kawaguchi | C23C 14/205 |
| | | | 343/907 |
| 2011/0262713 A1 | 10/2011 | Nakao et al. | |
| 2013/0048072 A1 | 2/2013 | Choi | |
| 2015/0212244 A1 | 7/2015 | Kim et al. | |
| 2015/0223326 A1 * | 8/2015 | Lim | H05K 3/46 |
| | | | 345/174 |

FOREIGN PATENT DOCUMENTS

| | | |
|---|---|---|
| CN | 101666886 A | 3/2010 |
| CN | 201503505 U | 6/2010 |
| CN | 102971862 A | 3/2013 |
| EP | 1067407 A1 | 1/2001 |
| EP | 1162059 A2 | 12/2001 |
| EP | 2383364 A1 | 11/2011 |
| EP | 3647047 A1 | 5/2020 |
| EP | 3647050 A1 | 5/2020 |
| EP | 3647051 A1 | 5/2020 |
| JP | 9-5516 A | 1/1997 |
| JP | 3004271 B2 | 1/2000 |
| JP | 2007-157601 A | 6/2007 |
| JP | 2008-083599 A | 4/2008 |
| JP | 2009-092913 A | 4/2009 |
| JP | 3153410 U | 9/2009 |
| JP | 2010-173273 A | 8/2010 |
| JP | 2010-197798 A | 9/2010 |
| JP | 5016722 B2 | 9/2012 |
| JP | 2015-533678 A | 11/2015 |
| KR | 2001-0089736 A | 10/2001 |
| KR | 10-2011-0019899 A | 3/2011 |
| KR | 10-2015-0129613 A | 11/2015 |

OTHER PUBLICATIONS

X. Lian, Relief Pattern Printing Process', Book in the Library of Beijing Institute of Graphic Communication, Printing Industry Press, the first edition, first printing, Nov. 1981.

Y. Ling et al., "Technical Manual I for Printing Ink", published by Printing Industry Publishing House, version I on May 2009.

* cited by examiner

[FIG. 1]
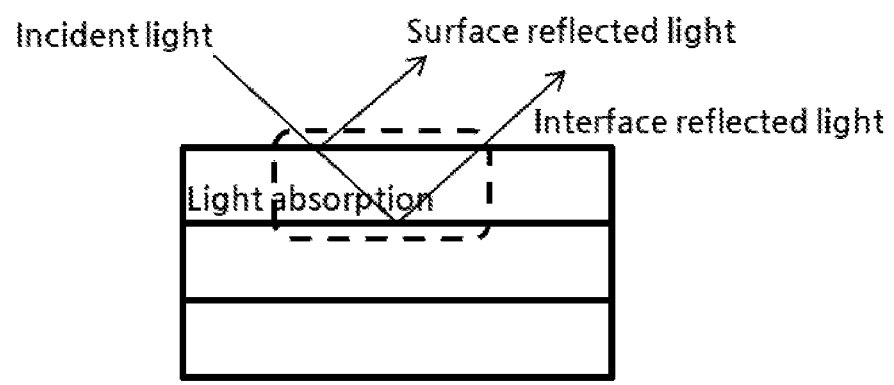

[FIG. 2]
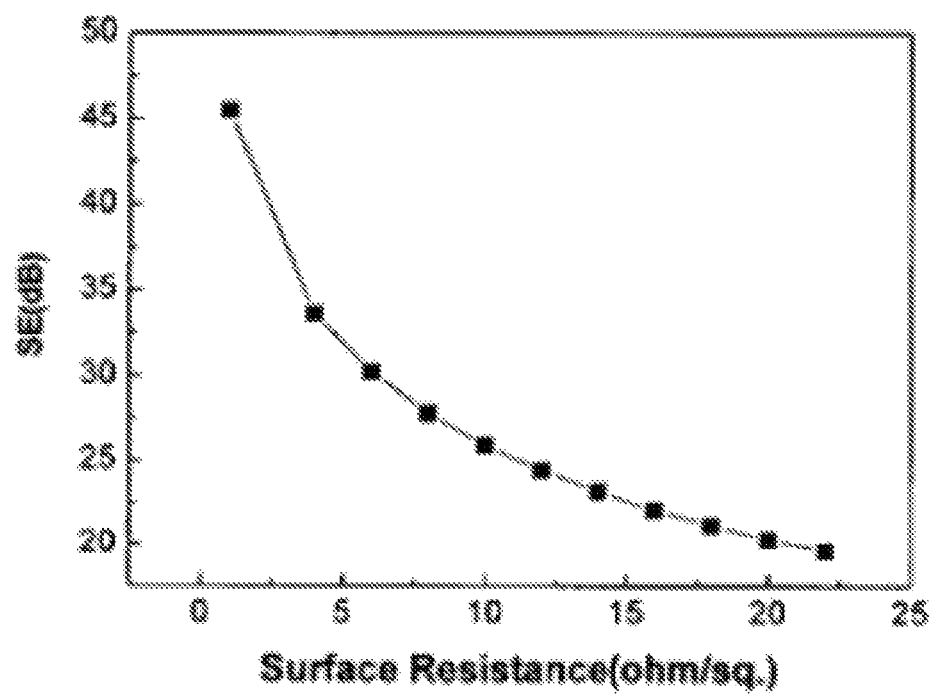
[FIG. 3]
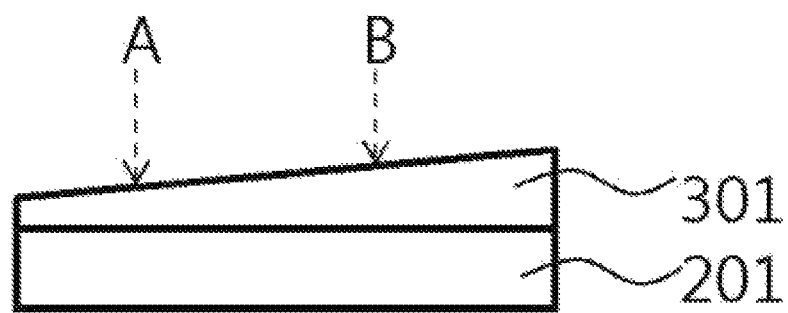

【FIG. 4】
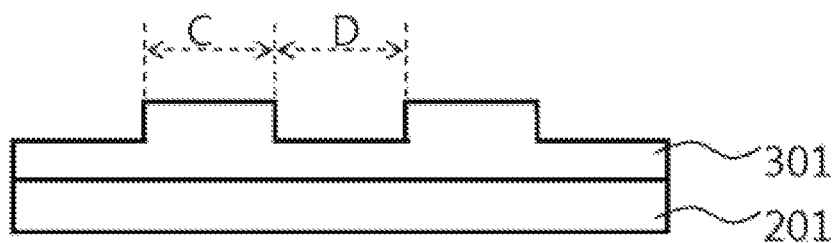
【FIG. 5】
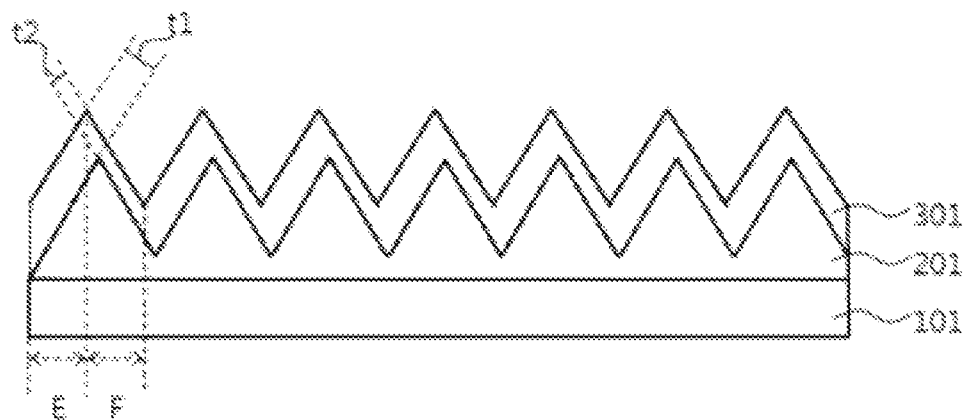

[FIG. 6]
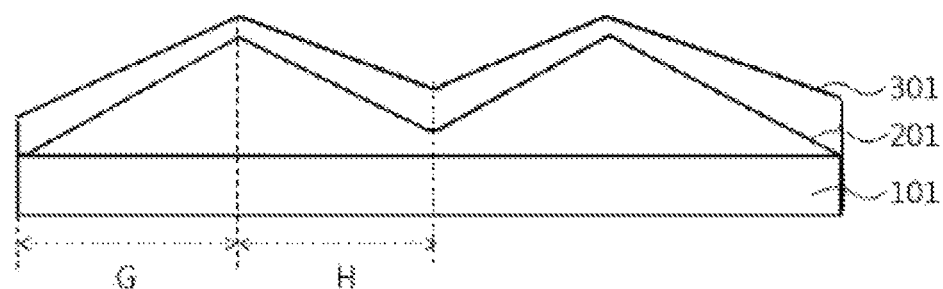
[FIG. 7]
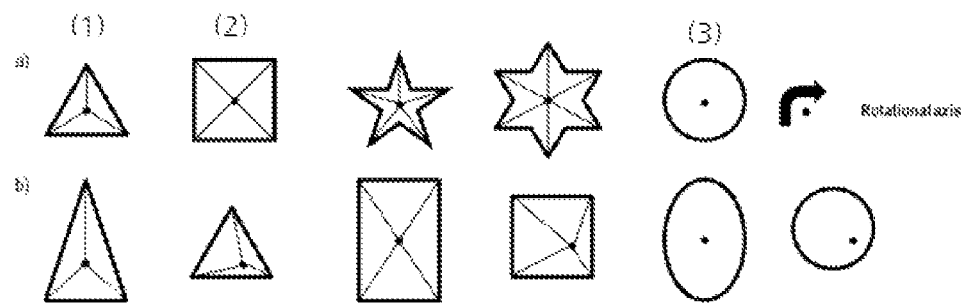
(1) Equilateral Triangle Pyramid
(2) Square Pyramid
(3) Circular Cone

[FIG. 8]
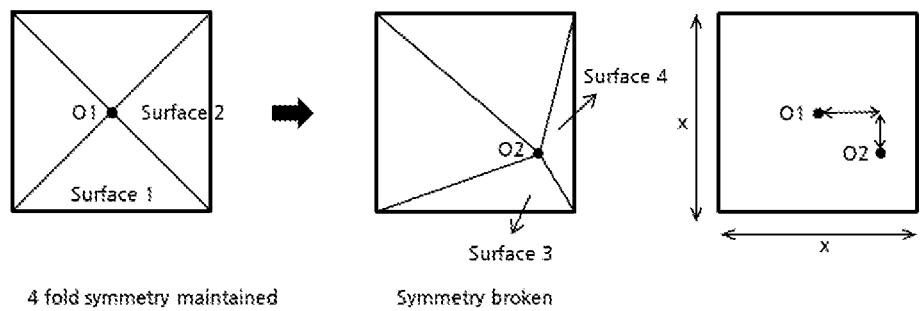
4 fold symmetry maintained → Symmetry broken
[FIG. 9(a)]  [FIG. 9(b)]
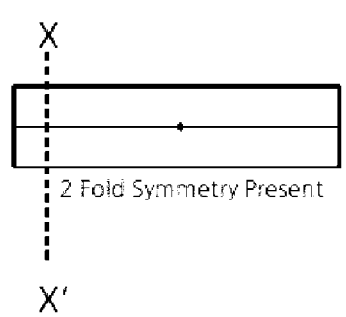 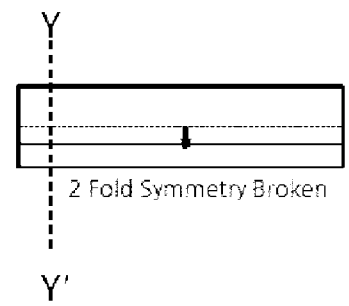 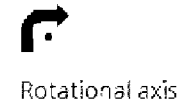
2 Fold Symmetry Present | 2 Fold Symmetry Broken | Rotational axis
 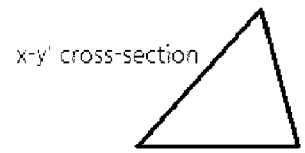
x-x' cross-section | x-y' cross-section

[FIG. 10]
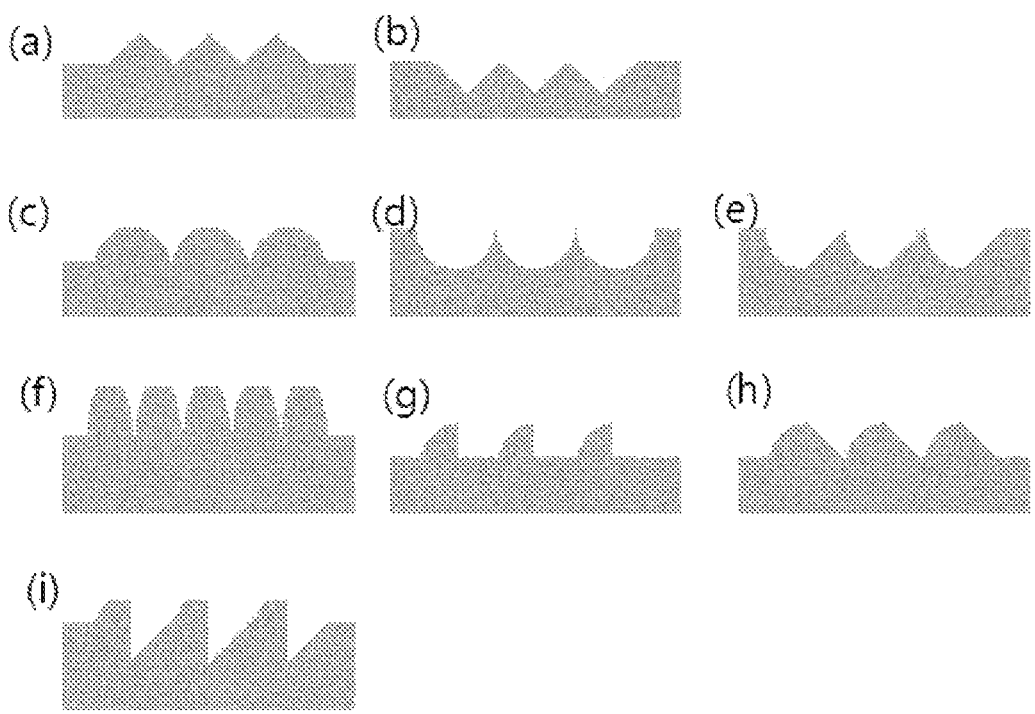

[FIG 11(a)]
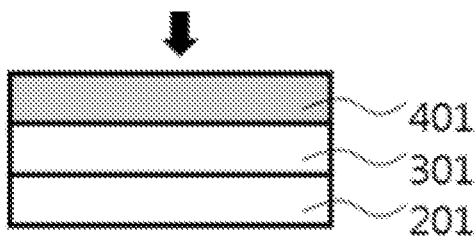
[FIG 11(b)]
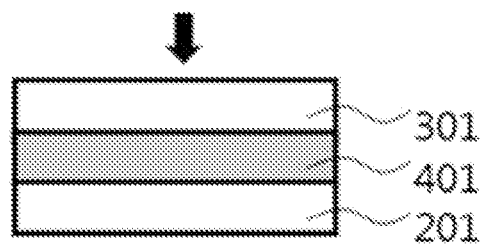
[FIG 11(c)]
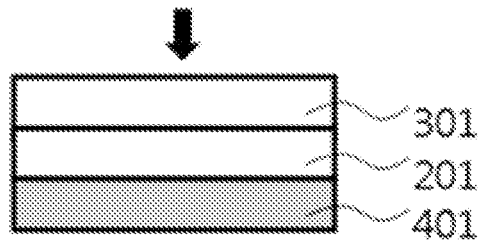

[FIG. 12(a)]
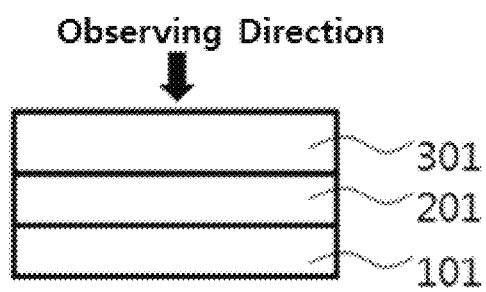
[FIG. 12(b)]
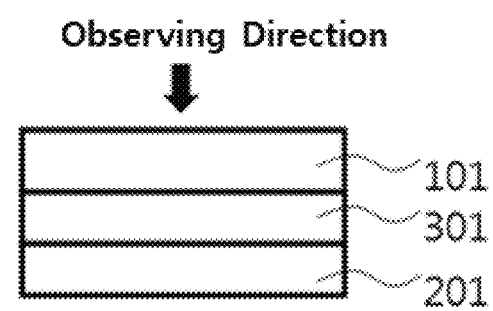

[FIG. 13(a)]
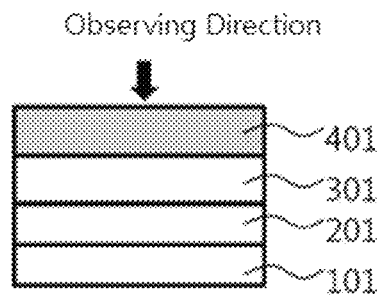
[FIG. 13(b)]
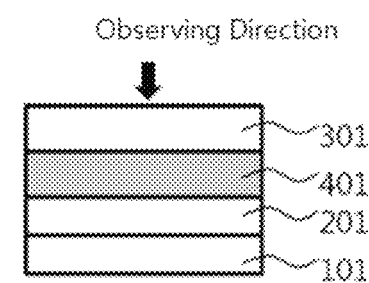
[FIG. 13(c)]
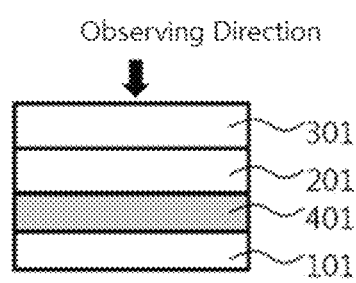
[FIG. 13(d)]
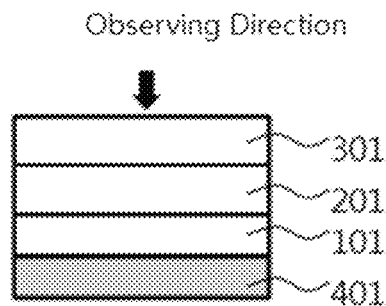
[FIG. 13(e)]
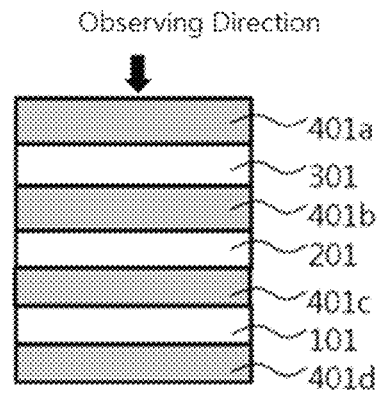

[FIG. 14(a)]
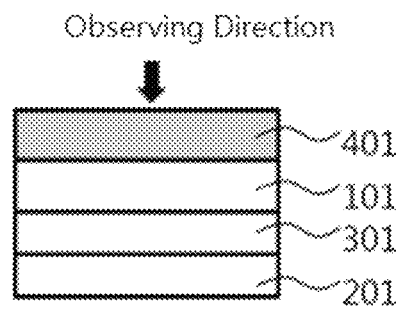
[FIG. 14(b)]
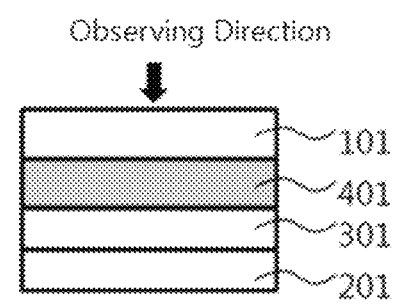
[FIG. 14(c)]
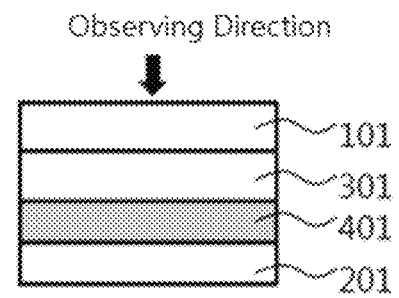
[FIG. 14(d)]
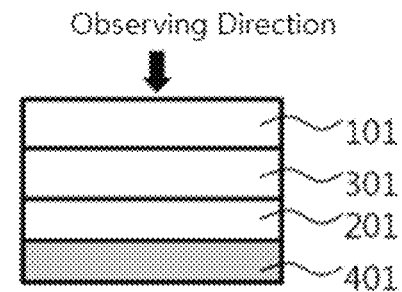
[FIG. 14(e)]
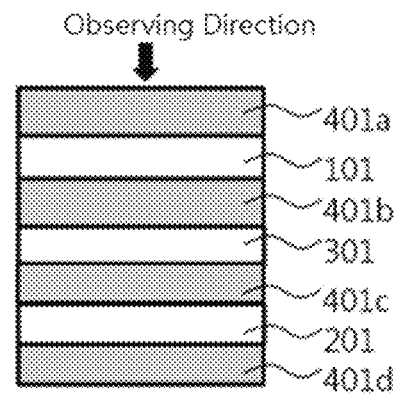

[FIG. 15]
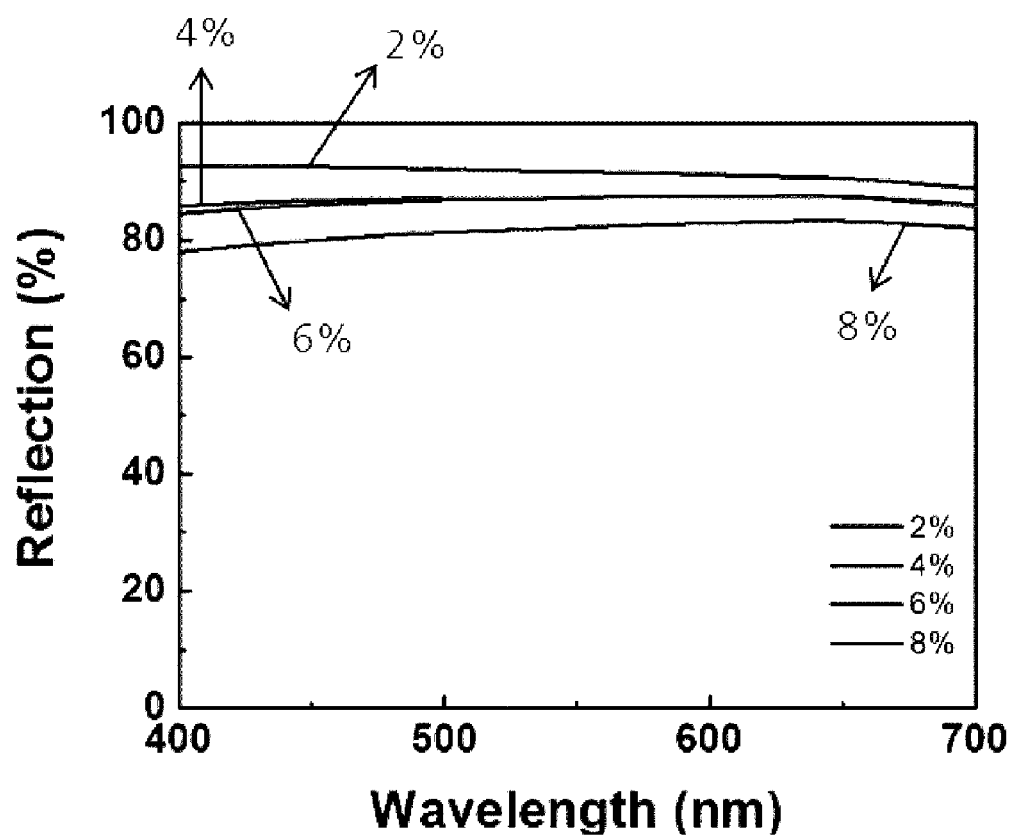

[FIG. 16]

| N₂ Flow Rate (sccm) | AlO$_x$N$_y$ | | | Specific Resistance ($\Omega \cdot cm$) | Color (CIE Color coordinate, Color) | |
|---|---|---|---|---|---|---|
| | Elemental content (Atomic %) | Relation Value | Surface Resistance ($\Omega/\square$) | | | |
| 6 | Al: 58.0±0.4<br>O: 4.8±1.5<br>N: 37.2±0.8 | 1.4 | 16 | $2 \times 10^{-4}$ | (51,1,7) | Light brown |
| 4 | Al: 57.6±0.5<br>O: 5.9±1.3<br>N: 36.5±0.8 | 1.4 | 4.7 | $2 \times 10^{-5}$ | (57,4,19) | Gold |

【FIG. 17】
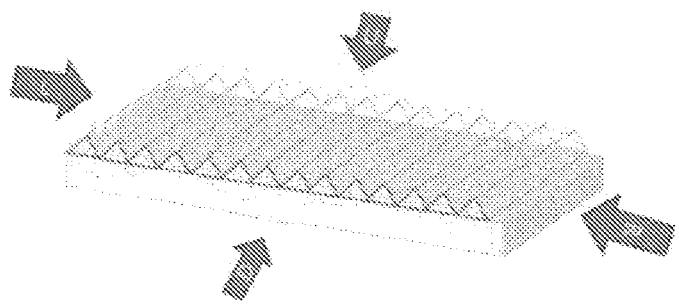
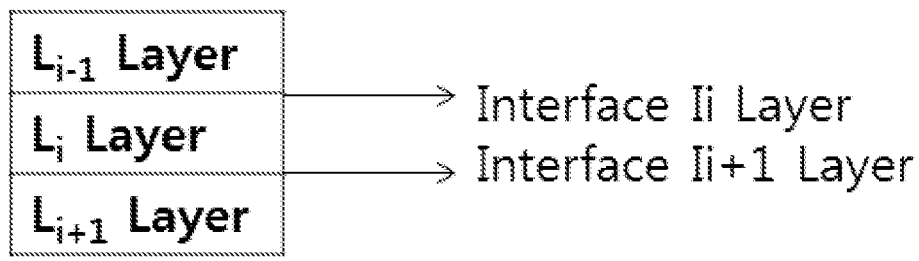
【FIG. 18】

DECORATIVE MEMBER AND METHOD FOR PREPARING SAME

CROSS-REFERENCE TO RELATED APPLICATIONS

This application is the U.S. national stage of PCT/KR2018/007278 filed Jun. 27, 2018, and claims priority to and the benefits of Korean Patent Application No. 10-2017-0081427, filed with the Korean Intellectual Property Office on Jun. 27, 2017, and Korean Patent Application No. 10-2017-0136834, filed with the Korean Intellectual Property Office on Oct. 20, 2017, the entire contents of which are incorporated herein by reference.

TECHNICAL FIELD

The present disclosure relates to a decoration element and a method for preparing the same. In particular, the present disclosure relates to a decoration element suitable to be used in mobile devices or electronic products, and a method for preparing the same.

BACKGROUND

For mobile phones, various mobile devices and electronic products, product designs such as colors, shapes and patterns play a major role in providing values of products to customers in addition to product functions. Product preferences and prices are also dependent on designs.

As for mobile phones as one example, various colors and color senses are obtained using various methods and used in products. A method of providing colors to a mobile phone case material itself or a method of providing designs by attaching a deco film implementing colors and shapes to a case material may be included.

In existing deco films, attempts have been made to develop colors through methods such as printing and deposition. When expressing heterogeneous colors on a single surface, printing needs to be conducted two or more times, and implementation is hardly realistic when to apply various colors to a three-dimensional pattern. In addition, existing deco films have fixed colors depending on a viewing angle, and even when there is a slight change, the change is limited to just a difference in the color sense.

SUMMARY

The present disclosure is directed to providing a decoration element capable of blocking electro-magnetic interference (EMI) as well as readily obtaining various colors due to a laminated structure of a light reflective layer and a light absorbing layer.

One embodiment of the present application provides a decoration element comprising a light reflective layer; and a light absorbing layer provided on the light reflective layer, wherein the light reflective layer has surface resistance of 20 ohm/square or less.

According to another embodiment of the present application, a color film is further provided on a surface opposite to the surface facing the light absorbing layer of the light reflective layer; between the light reflective layer and the light absorbing layer; or on a surface opposite to the surface facing the light reflective layer of the light absorbing layer. The color film employs a color difference $\Delta E^*ab$, a distance in space of $L^*a^*b^*$ in a color coordinate CIE $L^*a^*b^*$ of a color developing layer, to be greater than 1 when the color film is present compared to when the color film is not provided.

In the present specification, the light absorbing layer may be expressed as the color developing layer.

According to another embodiment of the present application, a substrate is provided on a surface opposite to the surface facing the light absorbing layer of the light reflective layer; or on a surface opposite to the surface facing the light reflective layer of the light absorbing layer. For example, when the substrate is provided on a surface opposite to the surface facing the light absorbing layer of the light reflective layer and the color film is located on a surface opposite to the surface facing the light absorbing layer of the light reflective layer, the color film may be provided between the substrate and the light reflective layer; or on a surface opposite to the surface facing the light reflective layer of the substrate. As another example, when the substrate is provided on a surface opposite to the surface facing the light reflective layer of the light absorbing layer and the color film is located on a surface opposite to the surface facing the light reflective layer of the light absorbing layer, the color film may be provided between the substrate and the light absorbing layer; or on a surface opposite to the surface facing the light absorbing layer of the substrate.

According to another embodiment of the present application, a substrate is further provided on a surface opposite to the surface facing the light reflective layer of the light absorbing layer, and the color film may be provided between the light absorbing layer and the substrate, or on a surface opposite to the surface facing the light absorbing layer of the substrate, or provided between the light reflective layer and the substrate, or on a surface opposite to the surface facing the light reflective layer of the substrate.

According to another embodiment of the present application, the light absorbing layer comprises two or more points with different thicknesses.

According to another embodiment of the present application, the light absorbing layer comprises two or more regions with different thicknesses.

According to another embodiment of the present application, the light absorbing layer comprises one or more regions in which an upper surface has an inclined surface with an inclined angle of greater than 0 degrees and less than or equal to 90 degrees, and the light absorbing layer comprises one or more regions having a thickness different from a thickness in any one region having the inclined surface.

According to another embodiment of the present application, the light absorbing layer comprises one or more regions with a gradually changing thickness.

According to another embodiment of the present application, the light absorbing layer comprises one or more regions in which an upper surface has an inclined surface with an inclined angle of greater than 0 degrees and less than or equal to 90 degrees, and at least one region having the inclined surface has a structure in which a thickness of the light absorbing layer gradually changes.

According to another embodiment of the present application, the light absorbing layer has an extinction coefficient (k) value of greater than 0 and less than or equal to 4, preferably 0.01 to 4 at 400 nm.

According to another embodiment of the present application, the decoration element is a deco film, a case of a mobile device, a case of an electronic product, or a commodity requiring color decoration.

According to embodiments described in the present specification, light absorption occurs in each of an entering path when external light enters through a color developing layer and in a reflection path when reflected, and since external light is reflected on each of a light absorbing layer surface and a light reflective layer surface, constructive interference and destructive interference phenomena occur between reflected light on the light absorbing layer surface and reflected light on the light reflective layer surface. Specific colors may be developed through such light absorption in the entering path and the reflection path, and the constructive interference and destructive interference phenomena. In addition, since developed colors are thickness dependent, colors may vary depending on thicknesses even when having the same material composition. In addition thereto, by using a light reflective layer having surface resistance within a specific range while having light reflection properties as the light reflective layer in the laminated structure of the light reflective layer and the light absorbing layer, a decoration member capable of blocking electro-magnetic interference (EMI) may be provided. As a result, electro-magnetic waves harmful to the human body can be blocked when using an electronic device using the decoration element.

DESCRIPTION OF DRAWINGS

FIG. 1 is a mimetic diagram for describing a working principle of color development in a light reflective layer and light absorbing layer structure.

FIG. 2 shows surface resistance-dependent electro-magnetic interference shielding properties.

FIG. 3 to FIG. 6 illustrate a laminated structure of a decoration element according to embodiments of the present application.

FIG. 7 to FIG. 10 illustrate an upper surface structure of a light absorbing layer of a decoration element according to embodiments of the present application.

FIG. 11 to FIG. 14 illustrate a laminated structure of a decoration element according to embodiments of the present disclosure.

FIG. 15 is a graph showing reflectance of an aluminum oxynitride layer by an $N_2$ partial pressure when forming aluminum oxynitride.

FIG. 16 illustrates properties of aluminum oxynitride capable of being used as a light reflective layer material.

FIG. 17 shows optical simulation results of Examples 3 and 4.

FIG. 18 is a diagram showing a method of discriminating a light absorbing layer and a light reflective layer.

DETAILED DESCRIPTION

Hereinafter, the present disclosure will be described in detail.

In the present specification, a "point" means one position that does not have an area. In the present specification, the expression is used to indicate that a light absorbing layer has two or more points with different thicknesses.

In the present specification, a "region" represents a part having a certain area. For example, when placing the decoration element on the ground so that a light reflective layer is placed at the bottom and the light absorbing layer is placed at the top and dividing both ends of the inclined surface or both ends with the same thickness perpendicular with respect to the ground, the region having an inclined surface means an area divided by the both ends of the inclined surface, and the region with the same thickness means an area divided by the both ends with the same thickness.

In the present specification, a "surface" or "region" may be a flat surface, but is not limited thereto, and a part or all may be a curved surface. For example, structures in which a vertical cross-section shape is a part of an arc of a circle or oval, a wave structure, a zigzag or the like may be included.

In the present specification, an "inclined surface" means, when placing the decoration member on the ground so that a light reflective layer is placed at the bottom and the light absorbing layer is placed at the top, a surface having an angle formed by the upper surface with respect to the ground of greater than 0 degrees and less than or equal to 90 degrees.

In the present specification, a "thickness" of a certain layer means a shortest distance from a lower surface to an upper surface of the corresponding layer.

In the present specification, "or" represents, unless defined otherwise, a case of selectively or all comprising those listed, that is, a meaning of "and/or".

In the present specification, a "layer" means covering 70% or more of an area where the corresponding layer is present. It means covering preferably 75% or more, and more preferably 80% or more.

In the present specification, surface resistance may be measured in accordance with a 4-point probe method using a known sheet resistor. As for the surface resistance, a resistance value (V/I) is measured by measuring a current (I) and voltage (V) using 4 probes, and by using an area (unit area, W) of a sample and a distance (L) between electrodes for measuring resistance, surface resistance is obtained (V/I×W/L), and then, a resistive corrector factor (RCF) is multiplied thereby to calculate as ohm/square, a surface resistance unit. The resistive corrector factor may be calculated using a sample size, a sample thickness and a temperature at the time of measurement, and may be calculated using the Poisson's equation. Surface resistance of the whole laminate may be measured and calculated from the laminate itself, and surface resistance of each layer may be measured before forming layers formed with remaining materials other than a target layer to measure from the whole laminate, may be measured after removing layers formed with remaining materials other than a target layer to measure from the whole laminate, or may be measured by analyzing materials of a target layer and then forming a layer under the same condition as the target layer.

A decoration element according to one embodiment of the present application comprises a light reflective layer; and a light absorbing layer provided on the light reflective layer, wherein the light reflective layer has surface resistance of 20 ohm/square or less. In such a structure, the decoration member may develop specific colors when observing from the light absorbing layer side.

The decoration element having such a constitution has properties capable of blocking electro-magnetic interference (EMI). With the development of electronic communications, the use of more electro-magnetic waves is inevitable. Accordingly, electro-magnetic interference (EMI) is a problem that may not be overlooked any more, and studies on its harmfulness to the human body have been continuously progressed. In view of the above, EMI regulations have been strengthened in household appliances and communication devices, and materials blocking electro-magnetic waves (EMI; electro-magnetic waves, NIR; near infrared, neon light) harmful to the human body emitted from LCDs and OLEDs have been required resulting in rapidly increasing demands thereon. With such market expansion, such an electro-magnetic wave shielding material according to an embodiment of the present disclosure waves is installed as a decoration element, for example, in a deco film form in driving a device comprising a display, that is, an electronic device having a large amount of electro-magnetic wave emission due to its properties, and is capable of effectively shielding the leakage of electro-magnetic waves. FIG. 2 shows a relation between surface resistance and EMI shielding properties.

In order to have a function of electro-magnetic wave shielding, the light reflective layer of the decoration element of the present disclosure has surface resistance of 20 ohm/square or less, and preferably, less than 20 ohm/square.

According to one embodiment, the light reflective layer has a value of 20 dB or greater, and may have surface resistance of 10 ohm/square or less. For example, the light reflective layer may have surface resistance of 1 ohm/square or less. Surface resistance of the light reflective layer is preferably low as possible for electro-magnetic wave shielding interference. For example, the light reflective layer may have surface resistance of 0.1 ohm/square or greater.

The light reflective layer is not particularly limited as long as it is a material capable of reflecting light, and capable of having the surface resistance described above in a given thickness or structure of the light reflective layer. Light reflectance may be determined depending on the material, and for example, colors are readily expressed at 50% or greater. Light reflectance may be measured using an ellipsometer.

As one example, the light reflective layer may be a single layer or a multilayer comprising one, two or more types of materials selected from among indium (In), titanium (Ti), tin (Sn), silicon (Si), germanium (Ge), aluminum (Al), copper (Cu), nickel (Ni), vanadium (V), tungsten (W), tantalum (Ta), molybdenum (Mo), neodymium (Nd), iron (Fe), chromium (Cr), cobalt (Co), gold (Au) and silver (Ag), or oxides, nitrides or oxynitrides thereof, and one, two or more types of materials among carbon and carbon composites. For example, the light reflective layer may comprise two or more alloys selected from among the above-mentioned materials, or oxides, nitrides or oxynitrides thereof. According to another embodiment, the light reflective layer may implement a light reflective layer by being prepared using an ink comprising carbon or carbon composites. Carbon black, CNT and the like may be included as the carbon or carbon composites. The ink comprising carbon or carbon composites may comprise above-described materials, or oxides, nitrides or oxynitrides thereof, and for example, one, two or more types of oxides selected from among indium (In), titanium (Ti), tin (Sn), silicon (Si), germanium (Ge). aluminum (Al), copper (Cu), nickel (Ni), vanadium (V), tungsten (W), tantalum (Ta), molybdenum (Mo), neodymium (Nd), iron (Fe), chromium (Cr), cobalt (Co), gold (Au) and silver (Ag) may be included. A curing process may be further carried out after printing the ink comprising carbon or carbon composites.

When the light reflective layer comprises two or more types of materials, the two or more types of materials may be formed using one process, for example, a method of deposition or printing, however, a method of first forming a layer using one or more types of materials, and then additionally forming a layer thereon using one or more types of materials may be used. For example, a light reflective layer may be formed by forming a layer through depositing indium or tin, then printing an ink comprising carbon, and then curing the result. The ink may further comprise oxides such as titanium oxides or silicon oxides.

For example, when using aluminum oxynitride, the following relation may be satisfied by having a composition of aluminum (Al) 57 at % to 60 at %, oxygen (O) 3 at % to 8 at % and nitrogen 35 at % to 38 at % in the layer. As a specific example, the value of the following relation may be from 1.4 to 1.5. According to one embodiment, the aluminum oxynitride layer formed under the condition of an $N_2$ flow rate range of 6 sccm or less ($N_2$ partial pressure 6%) may satisfy a surface resistance (Rs) range of less than 20 ohm/sq. Reflectance of the aluminum oxynitride layer by the $N_2$ partial pressure when forming the aluminum oxynitride layer is shown in FIG. 15. More specifically, the material of FIG. 16 may be used as a material of the light reflective layer. The $N_2$ flow rate of FIG. 16 represents a flow rate of reactive gas $N_2$ used for forming the aluminum oxynitride, and the color is a color observed from the light reflective layer.

$$1 < \frac{(Al)at \times 3}{(O)at \times 2 + (N)at \times 3} < 2 \quad \text{Relation}$$

The light absorbing layer preferably has a refractive index (n) of 0 to 8 at 400 nm, and the refractive index may be from 0 to 7, may be from 0.01 to 3, and may be from 2 to 2.5. The refractive index (n) may be calculated by $\sin \theta 1/\sin \theta 2$ ($\theta 1$ is an angle of light incident on a surface of the light absorbing layer, and $\theta 2$ is a refraction angle of light inside the light absorbing layer).

The light absorbing layer preferably has a refractive index (n) of 0 to 8 at 380 nm to 780 nm, and the refractive index may be from 0 to 7, may be from 0.01 to 3, and may be from 2 to 2.5.

The light absorbing layer may have an extinction coefficient (k) of greater than 0 and less than or equal to 4 at 400 nm, and the extinction coefficient (k) is preferably from 0.01 to 4, may be from 0.01 to 3.5, may be from 0.01 to 3, and may be from 0.1 to 1. The extinction coefficient (k) is $-\lambda/4\pi I$ (dI/dx) (herein, a value multiplying $\lambda/4\pi$ with dI/I, a reduced fraction of light intensity per a path unit length (dx), for example 1 m, in the light absorbing layer, and herein, $\lambda$ is a wavelength of light).

The light absorbing layer may have an extinction coefficient (k) of greater than 0 and less than or equal to 4, preferably 0.01 to 4, at 380 nm to 780 nm, and the extinction coefficient (k) is preferably from 0.01 to 4, may be from 0.01 to 3.5, may be from 0.01 to 3, and may be from 0.1 to 1.

The extinction coefficient (k) is in the above-mentioned range at 400 nm, preferably in the whole visible wavelength region of 380 nm to 780 nm, and therefore, a role of the light absorbing layer may be performed in the visible range. Even when having the same refractive index (n) value, a difference of $$\Delta E^*ab = \sqrt{\{(\Delta L)^2 + (\Delta a)^2 + (\Delta b)^2\}}$$

>1 may be obtained when the extinction coefficient (k) value is 0 and when the extinction coefficient (k) value is 0.01 at 400 nm. For example, when simulating a case of irradiating D65 (solar spectrum) as a light source on a laminated structure of glass/light reflective layer/light absorbing layer/air layer, E*ab values when the k values of the light absorbing layer are 0 and 0.01 are obtained as in the following Table 1. Herein, the thickness (h1) of the light reflective layer is 120 nm, and the thickness (h2) of the light absorbing layer is described in the following Table 1. The k values are arbitrarily set at 0 and 0.01 for the simulation, and as the n value, the value of aluminum is used.

TABLE 1

| h2 [nm] | k = 0 | | | k = 0.01 | | | ΔE * ab |
|---|---|---|---|---|---|---|---|
| | L | A | B | L | A | b | |
| 40 | 52.17 | 8.8 | −16.01 | 51.08 | 9.1 | −15.75 | 1.16 |
| 60 | 57.52 | 2.98 | −20.25 | 56.26 | 3.19 | −20.39 | 1.29 |
| 80 | 64.38 | −1.37 | −17.22 | 63.12 | −1.33 | −17.52 | 1.3 |

For example, using a method of absorbing light by adding a dye to a resin, and using a material having an extinction coefficient as described above lead to different light absorption spectra. When absorbing light by adding a dye to a resin, an absorption wavelength band is fixed, and only a phenomenon of varying an absorption amount depending on the changes in the coating thickness occurs. In addition, in order to obtain a target light absorption amount, changes in the thickness of at least a few micrometers or more are required to adjust the light absorption amount. On the other hand, in materials having an extinction coefficient, a wavelength band absorbing light changes even when the thickness changes by a several to tens of nanometer scale.

According to one embodiment, the light absorbing layer may be a single layer, or a multilayer of two or more layers.

The light absorbing layer may be formed with materials having an extinction coefficient (k) at 400 nm, preferably 380 nm to 780 nm, that is, materials having an extinction coefficient of greater than 0 and less than or equal to 4, preferably 0.01 to 4. For example, the light absorbing layer may comprise one, two or more selected from the group consisting of metals, metalloids, and oxides, nitrides, oxynitrides and carbides of metals or metalloids. The oxides, nitrides, oxynitrides or carbides of metals or metalloids may be formed under a deposition condition and the like set by those skilled in the art. The light absorbing layer may also comprise the same metals, metalloids, alloys or oxynitrides of two or more types as the light reflective layer.

For example, the light absorbing layer may be a single layer or a multilayer comprising one, two or more types of materials selected from among indium (In), titanium (Ti), tin (Sn), silicon (Si), germanium (Ge), aluminum (Al), copper (Cu), nickel (Ni), vanadium (V), tungsten (W), tantalum (Ta), molybdenum (Mo), neodymium (Nd), iron (Fe), chromium (Cr), cobalt (Co), gold (Au) and silver (Ag), or oxides, nitrides or oxynitrides thereof. As specific examples, the light absorbing layer comprises one, two or more types selected from among copper oxides, copper nitrides, copper oxynitrides, aluminum oxides, aluminum nitrides, aluminum oxynitrides and molybdenum titanium oxynitrides.

According to one embodiment, the light absorbing layer comprises silicon (Si) or germanium (Ge).

The light absorbing layer formed with silicon (Si) or germanium (Ge) may have a refractive index (n) of 0 to 8, or 0 to 7 at 400 nm, and may have an extinction coefficient (k) of greater than 0 and less than or equal to 4, preferably 0.01 to 4, and the extinction coefficient (k) may be from 0.01 to 3 or from 0.01 to 1.

According to another embodiment, the light absorbing layer comprises one, two or more types selected from among copper oxides, copper nitrides, copper oxynitrides, aluminum oxides, aluminum nitrides, aluminum oxynitrides and molybdenum titanium oxynitrides. In this case, the light absorbing layer may have a refractive index (n) of 1 to 3, for example, 2 to 2.5 at 400 nm, and an extinction coefficient (k) of greater than 0 and less than or equal to 4, preferably 0.01 to 2.5, preferably 0.2 to 2.5, and more preferably 0.2 to 0.6.

According to one embodiment, the light absorbing layer is AlOxNy (x>0, y>0).

According to another embodiment, the light absorbing layer may be AlOxNy (0≤x≤1.5, 0≤y≤1).

According to another embodiment, the light absorbing layer is AlOxNy (x>0, y>0), and with respect to the total number of atoms 100%, the number of each atom satisfies the following equation.

$$1 < \frac{(Al)at \times 3}{(O)at \times 2 + (N)at \times 3} < 2$$

According to one embodiment, the light absorbing layer may be formed with materials having an extinction coefficient (k) at 400 nm, preferably at 380 nm to 780 nm.

According to one embodiment, the thickness of the light reflective layer may be determined depending on target color in a final structure, and for example, may be 1 nm or greater, preferably 25 nm or greater, for example, 50 nm or greater, and preferably 70 nm or greater.

According to one embodiment, the thickness of the light absorbing layer may be from 5 nm to 500 nm, for example, from 30 nm to 500 nm.

According to one embodiment, a difference in the thickness by the region of the light absorbing layer is from 2 nm to 200 nm, and may be determined depending on a target color difference.

According to another embodiment of the present application, the light absorbing layer has surface resistance of 20 ohm/square or less, and preferably less than 20 ohm/square. For example, the light absorbing layer may have surface resistance of 10 ohm/square or less. For example, the light absorbing layer may have surface resistance of 1 ohm/square or less. Surface resistance of the light absorbing layer is preferably low as possible for electro-magnetic wave shielding interference. For example, the light absorbing layer may have surface resistance of 0.1 ohm/square or greater.

According to another embodiment of the present application, the whole decoration element comprising the light reflective layer and the light absorbing layer may have surface resistance of 10 ohm/square or less. For example, the whole decoration element may have surface resistance of 1 ohm/square or less. Surface resistance of the decoration element is preferably low as possible for electro-magnetic wave shielding interference. For example, the decoration element may have surface resistance of 0.1 ohm/square or greater.

According to another embodiment of the present application, a color film is further provided on a surface opposite to the surface facing the light absorbing layer of the light reflective layer; between the light reflective layer and the light absorbing layer; or on a surface opposite to the surface facing the light reflective layer of the light absorbing layer. When a substrate is provided on the light reflective layer side, the color film may be provided between the light reflective layer and the substrate; or on a surface opposite to the surface facing the light reflective layer of the substrate. When a substrate is provided on the light absorbing layer side, the color film may be provided between the light absorbing layer and the substrate; or on a surface opposite to the surface facing the light absorbing layer of the substrate.

When the color film is present compared to when the color film is not provided, the color film is not particularly limited as long as it has a color difference ΔE*ab, a distance in space of L*a*b* in a color coordinate CIE L*a*b* of the color developing layer, being greater than 1.

Colors may be expressed by CIE L*a*b*, and a color difference may be defined using a distance (ΔE*ab) in the L*a*b* space. Specifically, the color difference is $$\Delta E^{*}ab = \sqrt{\{(\Delta L)^2 + (\Delta a)^2 + (\Delta b)^2\}},$$

and within a range of 0<ΔE*ab<1, an observer may not recognize the color difference [reference document: Machine Graphics and Vision 20(4):383-411]. Accordingly, a color difference obtained by the color film addition may be defined by ΔE*ab>1 in the present specification.

FIG. 11(a) illustrates a structure in which a light reflective layer (201), a light absorbing layer (301) and a color film (401) are consecutively laminated, FIG. 11(b) illustrates a structure in which a light reflective layer (201), a color film (401) and a light absorbing layer (301) are consecutively laminated, and FIG. 11(c) illustrates a structure in which a color film (401), a light reflective layer (201) and a light absorbing layer (301) are consecutively laminated.

The color film may also perform a role of a substrate. For example, those that may be used as a substrate may be used as a color film by adding a pigment or a dye thereto.

The substrate may be provided on a surface opposite to the surface facing the light absorbing layer of the light reflective layer; or on a surface opposite to the surface facing the light reflective layer of the light absorbing layer. FIG. 12(a) illustrates an example of the substrate being provided on a surface opposite to the surface facing the light absorbing layer of the light reflective layer, and FIG. 12(b) illustrates an example of the substrate being provided on a surface opposite to the surface facing the light reflective layer of the light absorbing layer.

For example, when the substrate is provided on a surface opposite to the surface facing the light absorbing layer of the light reflective layer and the color film is located on a surface opposite to the surface facing the light absorbing layer of the light reflective layer, the color film may be provided between the substrate and the light reflective layer; or on a surface opposite to the surface facing the light reflective layer of the substrate. As another example, when the substrate is provided on a surface opposite to the surface facing the light reflective layer of the light absorbing layer and the color film is located on a surface opposite to the surface facing the light reflective layer of the light absorbing layer, the color film may be provided between the substrate and the light absorbing layer; or on a surface opposite to the surface facing the light absorbing layer of the substrate.

According to another embodiment of the present application, the substrate is provided on a surface opposite to the surface facing the light reflective layer of the light absorbing layer, and the color film is further provided. FIG. 13(a) illustrates a structure in which the color film (401) is provided on a surface opposite to the light reflective layer (201) side of the light absorbing layer (301), FIG. 13(b) illustrates a structure in which the color film (401) is provided between the light absorbing layer (301) and the light reflective layer (201), FIG. 13(c) illustrates a structure in which the color film (401) is provided between the light reflective layer (201) and the substrate (101), and FIG. 13(d) illustrates a structure in which the color film (401) is provided on a surface opposite to the light reflective layer (201) side of the substrate (101). FIG. 13(e) illustrates a structure in which the color films (401a, 401b, 401c, 401d) are provided on a surface opposite to the light reflective layer (201) side of the light absorbing layer (301), between the light absorbing layer (301) and the light reflective layer (201), between the light reflective layer (201) and the substrate (101), and on a surface opposite to the light reflective layer (201) side of the substrate (101), respectively, however, the structure is not limited thereto, and 1 to 3 of the color films (401a, 401b, 401c, 401d) may not be included.

According to another embodiment of the present application, the substrate is provided on a surface opposite to the surface facing the light reflective layer of the light absorbing layer, and the color film is further provided. FIG. 14(a) illustrates a structure in which the color film (401) is provided on a surface opposite to the light absorbing layer (301) side of the substrate (101), FIG. 14(b) illustrates a structure in which the color film (401) is provided between the substrate (101) and the light absorbing layer (301), FIG. 14(c) illustrates a structure in which the color film (401) is provided between the light absorbing layer (301) and the light reflective layer (201), and FIG. 14(d) illustrates a structure in which the color film (401) is provided on a surface opposite to the light absorbing layer (301) side of the light reflective layer (201). FIG. 14(e) illustrates a structure in which the color films (401a, 401b, 401c, 401d) are provided on a surface opposite to the light absorbing layer (201) side of the substrate (101), between the substrate (101) and the light absorbing layer (301), between the light absorbing layer (301) and the light reflective layer (201), and on a surface opposite to the light absorbing layer (201) side of the light reflective layer (201), respectively, however, the structure is not limited thereto, and 1 to 3 of the color films (401a, 401b, 401c, 401d) may not be included.

In the structures such as FIG. 13(b) and FIG. 14(c), the light reflective layer may reflect light entering through the color film when the color film has visible light transmittance of greater than 0%, and therefore, colors may be obtained by laminating the light absorbing layer and the light reflective layer.

In the structures such as FIG. 13(c), FIG. 13(d) and FIG. 14(d), light transmittance of the colors developed from the color film of the light reflective layer (201) may be 1% or greater, preferably 3% or greater and more preferably 5% or greater so that changes in the color difference obtained by the color film addition may be recognized. This is due to the fact that light transmitted in such a light transmittance range may be mixed with colors obtained by the color film.

The color film may be provided as one sheet, or as a laminate of 2 sheets or more that are the same or different types.

As the color film, those capable of developing target colors by combining with colors developed from the laminated structure of the light reflective layer and the light absorbing layer described above may be used. For example, color films expressing colors by one, two or more types of pigments and dyes being dispersed into a matrix resin may be used. Such a color film may be formed by directly coating a composition for forming a color film on a color film-providable location, or a method of preparing a color film by coating a composition for forming a color film on a separate substrate or using a known molding method such as casting or extrusion, and then disposing or attaching the color film on a color film-providable location may be used.

The pigment and the dye capable of being included in the color film may be selected from among those capable of obtaining target colors from a final decoration member, and known in the art, and one, two or more types among pigments and dyes such as red-based, yellow-based, purple-based, blue-based or pink-based may be used. Specifically, dyes such as perinone-based red dyes, anthraquinone-based red dyes, methane-based yellow dyes, anthraquinone-based yellow dyes, anthraquinone-based purple dyes, phthalocyanine-based blue dyes, thioindigo-based pink dyes or isoxindigo-based pink dyes may be used either alone or as a combination. Pigments such as carbon black, copper phthalocyanine (C.I. Pigment Blue 15:3), C.I. Pigment Red 112, Pigment blue or isoindoline yellow may be used either alone or as a combination. As such dyes or pigments, those commercially available may be used, and for example, materials manufactured by Ciba ORACET or Chokwang Paint Ltd. may be used. Types of the dyes or pigments and colors thereof are for illustrative purposes only, and various known dyes or pigments may be used, and more diverse colors may be obtained therefrom.

As the matrix resin included in the color film, materials known as materials of transparent films, primer layers, adhesive layers or coating layers may be used, and the matrix resin is not particularly limited to these materials. For example, various materials such as acryl-based resins, polyethylene terephthalate-based resins, urethane-based resins, linear olefin-based resins, cycloolefin-based resins, epoxy-based resins or triacetylcellulose-based resins may be selected, and copolymers or mixtures of the materials illustrated above may also be used.

When the color film is disposed closer to the location observing a decoration member than the light reflective layer or the light absorbing layer as in, for example, the structures of FIGS. 13(a) and (b), and FIGS. 14(a), (b) and (c), light transmittance of the colors developed by the color film from the light reflective layer, the light absorbing layer or the laminated structure of the light reflective layer and the light absorbing layer may be 1% or greater, preferably 3% or greater and more preferably 5% or greater. As a result, target colors may be obtained by combining colors developed from the color film and colors developed from the light reflective layer, the light absorbing layer or the laminated structure thereof.

The thickness of the color film is not particularly limited, and those skilled in the art may select and set the thickness as long as it is capable of obtaining target colors. For example, the color film may have a thickness of 500 nm to 1 mm.

According to another embodiment of the present application, when the light absorbing layer comprises a pattern, the pattern may have a symmetric structure, an asymmetric structure or a combination thereof.

According to one embodiment, the light absorbing layer may comprise a symmetric-structured pattern. As the symmetric structure, a prism structure, a lenticular lens structure and the like are included.

In the present specification, the asymmetric-structured pattern means having an asymmetric structure on at least one surface when observing from an upper surface, a side surface or a cross-section. The decoration member may develop dichroism when having such an asymmetric structure. Dichroism means different colors being observed depending on a viewing angle.

Dichroism may be expressed by $$\Delta E^*ab = \sqrt{\{(\Delta L)^2+(\Delta a)^2+(\Delta b)^2\}}$$

relating to the color difference described above, and a viewing angle-dependent color difference being $\Delta E^*ab > 1$ may be defined as having dichroism.

According to one embodiment, the light absorbing layer has dichroism of $\Delta E^*ab > 1$.

According to one embodiment, the light absorbing layer comprises a pattern in which an upper surface has a cone-shaped protrusion or groove. The cone shape comprises a shape of a circular cone, an oval cone or a polypyramid. Herein, the shape of the bottom surface of the polypyramid comprises a triangle, a square, a star shape having 5 or more protruding points, and the like. The cone shape may have a shape of a protrusion formed on an upper surface of the light absorbing layer, or a shape of a groove formed on an upper surface of the light absorbing layer. The protrusion has a triangular cross-section, and the groove has an inverted triangular cross-section. A lower surface of the light absorbing layer may also have the same shape as the upper surface of the light absorbing layer.

According to one embodiment, the cone-shaped pattern may have an asymmetric structure. For example, when rotating the cone-shaped pattern 360 degrees based on the vertex of the cone and observing from the upper surface, dichroism is difficult to be developed from the pattern when three or more same shapes are present. However, when rotating the cone-shaped pattern 360 degrees based on the vertex of the cone and observing from the upper surface, dichroism may be developed when two or less same shapes are present. FIG. 7 illustrates an upper surface of the cone shape, and (a) all illustrates a symmetric-structured cone shape, and (b) illustrates an asymmetric-structured cone shape.

The symmetric-structured cone shape has a structure in which a cone-shaped bottom surface is a circle or a regular polygon having the same side lengths, and the vertex of the cone is present on a vertical line of the center of gravity of the bottom surface. However, the asymmetric-structured cone shape has a structure in which, when observing from the upper surface, the position of the vertex of the cone is present on a vertical line of a point that is not the center of gravity of the bottom surface, or has a structure in which the bottom surface is an asymmetric-structured polygon or oval. When the bottom surface is an asymmetric-structured polygon, at least one of the sides and the angles of the polygon may be designed to be different from the rest.

For example, as in FIG. 8, the position of the vertex of the cone may be changed. Specifically, when designing the vertex of the cone to be located on a vertical line of the center of gravity (O1) of the bottom surface when observing from the upper surface as in the first drawing of FIG. 8, 4 identical structures may be obtained when rotating 360 degrees based on the vertex of the cone (4-fold symmetry). However, the symmetric structure is broken by designing the vertex of the cone on a position (O2) that is not the center of gravity (O1) of the bottom surface. When employing a length of one side of the bottom surface as x, migration distances of the vertex of the cone as a and b, a height of the cone shape, a length of a line vertically connecting from the vertex of the cone (O1 or O2) to the bottom surface, as h, and an angle formed by the bottom surface and a side surface of the cone as θn, cosine values for Surface 1, Surface 2, Surface 3 and Surface 4 of FIG. 8 may be obtained as follows.

$$\cos(\theta 1) = \frac{\left(\frac{x}{2}\right)}{sqrt\left(h^2+\left(\frac{x}{2}\right)^2\right)}$$

$$\cos(\theta 2) = \frac{\left(\frac{x}{2}\right)}{sqrt\left(h^2 + \left(\frac{x}{2}\right)^2\right)}$$

$$\cos(\theta 3) = \frac{\left(\frac{x}{2} - a\right)}{sqrt\left(h^2 + \left(\frac{x}{2} - a\right)^2\right)}$$

$$\cos(\theta 4) = \frac{\left(\frac{x}{2} - b\right)}{sqrt\left(h^2 + \left(\frac{x}{2} - b\right)^2\right)}$$

Herein, θ1 and θ2 are the same, and therefore, there is no dichroism. However, θ3 and θ4 are different, and |θ3-θ4| means a color difference between two colors (E*ab), and therefore, dichroism may be obtained. Herein, |θ3-θ4|>0. As above, how much the symmetric structure is broken, that is, a degree of asymmetry, may be represented quantitatively using an angle formed by the bottom surface and a side surface of the cone, and the value representing such a degree of asymmetry is proportional to a color difference of dichroism.

According to another embodiment, the light absorbing layer comprises a pattern having a protrusion in which the highest point has a line shape or a groove in which the lowest point has a line shape. The line shape may be a straight-line shape or a curved-line shape, and may comprise both a curved line and a straight line. When rotating the pattern having a line-shaped protrusion or groove 360 degrees based on the center of gravity of an upper surface and observing from the upper surface, dichroism is difficult to be developed when two or more same shapes are present. However, when rotating the pattern having a line-shaped protrusion or groove 360 degrees based on the center of gravity of an upper surface and observing from the upper surface, dichroism may be developed when only one same shape is present. FIGS. 9(a) and 9(b) illustrate an upper surface of a pattern having a line-shaped protrusion. FIG. 9(a) illustrates a pattern having a line-shaped protrusion developing no dichroism and FIG. 9(b) illustrates a pattern having a line-shaped protrusion developing dichroism. An X-X' cross-section of FIG. 9(a) is an isosceles triangle or an equilateral triangle, and a Y-Y' cross-section of FIG. 9(b) is a triangle having different side lengths.

According to another embodiment, the light absorbing layer comprises a pattern in which an upper surface has a protrusion or groove with a structure in which the cone-shaped upper surface is cut. Such a cross-section of the pattern may have a trapezoidal or inversed trapezoidal shape. In this case, dichroism may also be developed by designing the upper surface, the side surface or the cross-section to have an asymmetric structure.

In addition to the structure illustrated above, various protrusion or groove patterns as in FIG. 10 may be obtained.

According to another embodiment of the present application, the light absorbing layer may comprise two or more regions with different thicknesses.

According to the embodiments, light absorption occurs in an entering path and a reflection path of light in the light absorbing layer, and by the light reflecting on each of a surface of the light absorbing layer and an interface of the light absorbing layer and the light reflective layer, the two reflected lights go through constructive or destructive interference. In the present specification, the light reflected on the surface of the light absorbing layer may be expressed as surface reflected light, and the light reflected on the interface of the light absorbing layer and the light reflective layer may be expressed as interface reflected light. FIG. 1 and FIG. 3 illustrate a mimetic diagram of such a working principle. In FIG. 3, a substrate is not included, however, a substrate may be provided at the bottom of the light reflective layer.

Through FIG. 18, the light absorbing layer and the light reflective layer are described. In the decoration element of FIG. 18, each layer is laminated in order of a $L_{i-1}$ layer, a $L_i$ layer and a $L_{i+1}$ layer based on a light entering direction, an interface $I_i$ is located between the $L_{i-1}$ layer and the $L_i$ layer, and an interface $I_{i+1}$ is located between the $L_i$ layer and the $L_{i+1}$ layer.

When irradiating light having a specific wavelength in a direction perpendicular to each layer so that thin film interference does not occur, reflectance at the interface $I_i$ may be expressed by the following Mathematical Equation 1.

$$\frac{[n_i(\lambda) - n_{i-1}(\lambda)]^2 + [k_i(\lambda) - k_{i-1}(\lambda)]^2}{[n_i(\lambda) + n_{i-1}(\lambda)]^2 + [k_i(\lambda) + k_{i-1}(\lambda)]^2} \quad \text{[Mathematical Equation 1]}$$

In Mathematical Equation 1, $n_i(\lambda)$ means a refractive index depending on the wavelength (λ) of the $i^{th}$ layer, and $k_i(\lambda)$ means an extinction coefficient depending on the wavelength (λ) of the $i^{th}$ layer. The extinction coefficient is a measure capable of defining how strongly a subject material absorbs light at a specific wavelength, and the definition is as described above.

Using Mathematical Equation 1, when a sum of reflectance for each wavelength at the interface $I_i$ calculated at each wavelength is $R_i$, $R_i$ is as in the following Mathematical Equation 2.

[Mathematical Equation 2]

$$R_i = \frac{\sum_{\lambda=380\,nm}^{\lambda=780\,nm} \frac{[n_i(\lambda) - n_{i-1}(\lambda)]^2 + [k_i(\lambda) - k_{i-1}(\lambda)]^2}{[n_i(\lambda) + n_{i-1}(\lambda)]^2 + [k_i(\lambda) + k_{i-1}(\lambda)]^2} \Delta\lambda}{\sum_{\lambda=380\,nm}^{\lambda=780\,nm} \Delta\lambda}$$

Examples of the structure according to the embodiment are illustrated in FIG. 3 and FIG. 4. In FIG. 3 and FIG. 4, a light absorbing layer (301) is provided on a light reflective layer (201), and the light absorbing layer has two or more points with different thicknesses. According to FIG. 3, thicknesses in A region and B region are different in the light absorbing layer (301). According to FIG. 4, thicknesses in C region and D region are different in the light absorbing layer (301).

According to another embodiment of the present application, the light absorbing layer comprises one or more regions in which an upper surface has an inclined surface with an inclined angle of greater than 0 degrees and less than or equal to 90 degrees, and the light absorbing layer comprises one or more regions having a thickness different from a thickness in any one region having the inclined surface.

Surface properties such as an upper surface slope of the light reflective layer may be the same as an upper surface of the light absorbing layer. For example, by using a deposition method when forming the light absorbing layer, the upper surface of the light absorbing layer may have the same slope as the upper surface of the light reflective layer.

FIG. 5 illustrates a structure of a decoration element having a light absorbing layer in which an upper surface has an inclined surface. The structure is a structure laminating a substrate (101), a light reflective layer (201) and a light absorbing layer (301), and thickness t1 in E region and thickness t2 in F region are different in the light absorbing layer (301).

FIG. 6 relates to a light absorbing layer having inclined surfaces facing each other, which is, having a structure with a triangle cross-section. In the structure of the pattern having inclined surfaces facing each other as in FIG. 6, a thickness of the light absorbing layer may be different in two surfaces of the triangle structure even when progressing deposition under the same condition. Accordingly, a light absorbing layer having two or more regions with different thicknesses may be formed using just one process. As a result, developed colors may become different depending on the thickness of the light absorbing layer. Herein, the thickness of the light reflective layer does not affect changes in the color when it is a certain thickness or greater.

According to another embodiment of the present application, the light absorbing layer comprises one or more regions with a gradually changing thickness. FIG. 3 illustrates a structure in which a thickness of the light absorbing layer gradually changes.

According to another embodiment of the present application, the light absorbing layer comprises one or more regions in which an upper surface has an inclined surface with an inclined angle of greater than 0 degrees and less than or equal to 90 degrees, and at least one region having the inclined surface has a structure in which a thickness of the light absorbing layer gradually changes. FIG. 6 illustrates a structure of a light absorbing layer comprising a region in which an upper surface has an inclined surface. In FIG. 6, both G region and H region have a structure in which an upper surface of the light absorbing layer has an inclined surface, and a thickness of the light absorbing layer gradually changes.

According to one embodiment, the light absorbing layer comprises a first region having a first inclined surface with an inclined angle in a range of 1 degrees to 90 degrees, and may further comprise a second region in which an upper surface has an inclined surface with a different slope direction or a different inclined angle from the first inclined surface, or an upper surface is horizontal. Herein, thicknesses in the first region and the second region may be different from each other in the light absorbing layer.

According to another embodiment, the light absorbing layer comprises a first region having a first inclined surface with an inclined angle in a range of 1 degrees to 90 degrees, and may further comprise two or more regions in which an upper surface has an inclined surface with a different slope direction or a different inclined angle from the first inclined surface, or an upper surface is horizontal. Herein, thicknesses in the first region and the two or more regions may all be different from each other in the light absorbing layer.

According to one embodiment, a substrate provided on a lower surface of the light reflective layer or an upper surface of the light absorbing layer may be further included. Surface properties such as an upper surface slope of the substrate may be the same as upper surfaces of the light reflective layer and the light absorbing layer. By forming the light reflective layer and the light absorbing layer using a deposition method, the substrate, the light reflective layer and the light absorbing layer may have an inclined surface with the same angle. For example, the structure as above may be obtained by forming an inclined surface or a three-dimensional structure on an upper surface of a substrate, and depositing a light reflective layer and a light absorbing layer thereon in this order, or depositing a light absorbing layer and a light reflective layer in this order.

According to one embodiment, forming an inclined surface or a three-dimensional structure on the substrate surface may be carried out using a method of forming a pattern on an ultraviolet curable resin and curing the result using ultraviolet rays, or processing with laser.

According to one embodiment, surface resistance of the whole decoration element described above comprising a light reflective layer, a light absorbing layer and, as necessary, a substrate is 20 ohm/square or less, for example, less than 20 ohm/square. Accordingly, a function of electromagnetic interference blocking may be accomplished as well when using the decoration element in an electronic device with the purpose of decoration.

According to one embodiment, the decoration element may be a deco film or a case of a mobile device. The decoration element may further comprise a gluing layer as necessary.

Materials of the substrate are not particularly limited, and ultraviolet curable resins known in the art may be used when forming an inclined surface or a three-dimensional structure using methods as above.

On the light absorbing layer, a protective layer may be further provided.

According to one embodiment, an adhesive layer may be further provided on an opposite surface of the substrate provided with the light absorbing layer or the light reflective layer. This adhesive layer may be an optically clear adhesive (OCA) layer. As necessary, a peel-off layer (release liner) may be further provided on the adhesive layer for protection.

Deposition such as a sputtering method has been described as an example of forming the light reflective layer and the light absorbing layer in the present specification, however, various methods of preparing a thin film may be used as long as constitutions and properties according to embodiments described in the present specification are obtained. For example, a vapor deposition method, a chemical vapor deposition (CVD) method, wet coating and the like may be used.

Hereinafter, the present disclosure will be described in more detail with reference to examples. However, the following examples are for illustrative purposes only, and are not to limit the scope of the present disclosure.

Examples 1 and 2 and Comparative Examples 1 and 2

On a transparent PET, a light reflective layer formed with aluminum oxynitride was formed using reactive sputtering deposition. A composition of the obtained light reflective layer is listed in Table 2. Light reflectance of the light reflective layer is shown in FIG. 15. 2%, 4%, 6% and 8% of FIG. 15 mean an $N_2$ partial pressure under the condition of the light reflective layer deposition.

A light absorbing layer (thickness 40 nm) formed with aluminum oxynitride was formed thereon using a condition of the following Table 3. A refractive index (n) and an extinction coefficient (k) of the light absorbing layer are shown in Table 4. When preparing the light absorbing layer, the deposition process was progressed under a vacuum condition of a base pressure of $3 \times 10^{-6}$ torr and a process pressure of 3 mtorr, Ar gas was adjusted to 100 sccm, and a flow rate of reactive gas $N_2$ was adjusted to prepare a light absorbing layer having a composition as in the following Table 3.

TABLE 2

| | Composition (at %) | | |
|---|---|---|---|
| Example 1 | Al: 57.2 ± 0.4 | O: 6.8 ± 1.3 | N: 35.5 ± 0.5 |
| Example 2 | Al: 57.8 ± 0.5 | O: 5.5 ± 1.3 | N: 36.8 ± 0.4 |
| Comparative Example 1 | Al: 58.5 ± 0.6 | O: 3.0 ± 1.7 | N: 38.5 ± 1.2 |
| Comparative Example 2 | Al: 58.8 ± 0.1 | O: 2.0 ± 0.7 | N: 39.2 ± 0.7 |

TABLE 3

| | $N_2$ Flow Rate (%) | Composition (at %) |
|---|---|---|
| Example 1 | 13.5 | Al: 58.9 ± 0.2<br>O: 1.9 ± 0.3<br>N: 39.2 ± 0.5 |
| Comparative Example 1, Example 2 | 13.8 | Al: 59.0 ± 0.6<br>O: 1.7 ± 0.6<br>N: 39.3 ± 0.5 |
| Comparative Example 2 | 14 | Al: 59.2 ± 0.1<br>O 1.5 ± 0.6<br>N: 39.3 ± 0.5 |

The elemental content measurement of Table 2 and Table 3 is by an XPS analysis method, and specific conditions are as follows.
    K-Alpha, Thermo Fisher Scientific Inc
    X-ray source: monochromatic Al Kα (1486.6 eV),
    X-ray spot size: 300 μm
    Ar ion etching: monatomic (1000 eV, high, Raster width: 1.5 mm, sputter rate: 0.18 nm/s)
    Operation mode: CAE (Constant Analyzer Energy) mode
    Charge compensation: default FG03 mode (250 μA, 1 V)

| Element | Scan Range | Step Size | Per Point Dwell Time | Number of Scan | Pass Energy |
|---|---|---|---|---|---|
| Narrow (Snapshot) | 20.89 eV | 0.1 eV | 1 s | 10 | 150 eV |
| Survey | 10 eV to 1,350 eV | 1 eV | 10 ms | 10 | 200 eV |

*Peak background: use smart method

TABLE 4

| | N2 Flow Rate (sccm) | n at 400 nm | k at 400 nm |
|---|---|---|---|
| Example 1 | 13.5 | 2.258 | 0.278 |
| Comparative Example 1, Example 2 | 13.8 | 2.217 | 0.198 |
| Comparative Example 2 | 14 | 2.061 | 0.019 |

Surface resistance and electro-magnetic wave shielding effectiveness (SE) of the light reflective layers prepared in the examples and the comparative examples were measured and the results are shown in the following Table 5. It was identified that electro-magnetic wave shielding was achieved better in the examples compared to the comparative examples.

Electro-magnetic wave shielding effectiveness (SE) is a value exhibiting an electric field shielding effect and a magnetic field shielding effect, is calculated by SE=10 log (P1/P0) for a received power level (P1) of a receiver while a load specimen is mounted with respect to a received power level (P0) of a receiver while a reference specimen is mounted, and is a sum of reflection loss (R), absorption loss (A) and a correction factor (B) of the light reflective layer.

Surface resistance for the light reflective layers of the examples and the comparative examples was measured in accordance with a 4-point probe method using a known surface resistor. Surface resistance of the whole laminate is determined by resistance of the reflective layer having low surface resistance since the layers are connected in parallel. Specifically, the surface resistance was measured using a measuring device of Hiresta MCP-HT450, ASP PROBE.

TABLE 5

| | Surface Resistance (ohm/square) | SE [dB] |
|---|---|---|
| Example 1 | 4.7 | 32 |
| Example 2 | 16 | 23 |
| Comparative Example 1 | 22 | 20.3 |
| Comparative Example 2 | 64 | 0.321 |

As described in Table 5, it was identified that electro-magnetic wave shielding effectiveness was superior in the examples.

Example 3

Preparation was carried out in the same manner as in Example 1 except that, instead of the transparent PET, a substrate forming a gold primer coating layer and an asymmetric prism structure on a transparent PET film was used.

Example 4

Preparation was carried out in the same manner as in Example 2 except that, instead of the transparent PET, a substrate forming a blue primer coating layer and an asymmetric prism structure on a transparent PET film was used.

Optical simulation results of Examples 3 and 4 are shown in FIG. 17. According to FIG. 17, it was seen that various colors were obtained with the asymmetric prism structure and color film introduction. Right, down, left and up of FIG. 17 represent obtained colors when looking the laminated film of FIG. 17 from the right, from the below, from the left and from the above, respectively, as indicated with the arrow of FIG. 17.

The invention claimed is:
1. A decoration element comprising:
    a light reflective layer; and
    a light absorbing layer provided on the light reflective layer,
    wherein the light reflective layer has a surface resistance of 20 ohm/square or less,
    wherein an upper surface of the light absorbing layer comprises:
        a pattern having cone-shaped protrusions or grooves, wherein, optionally, an upper surface of the cone-shaped protrusions or grooves is cut, or
        a pattern having protrusions in which the highest point has a line shape or grooves in which the lowest point has a line shape, and wherein the pattern having cone-shaped protrusions or grooves has two or less protrusions or grooves having a same shape when the upper surface of the cone-shaped pattern is observed while rotating the cone-shaped pattern 360 degrees around a vertex of the cone-shaped protrusions.

2. The decoration element of claim 1, wherein the surface resistance of the light reflective layer is 10 ohm/square or less.

3. The decoration element of claim 1, wherein the light reflective layer is a single layer or a multilayer comprising one or more materials selected from: indium (In), tin (Sn), silicon (Si), germanium (Ge), aluminum (Al), copper (Cu), nickel (Ni), vanadium (V), tungsten (W), tantalum (Ta), molybdenum (Mo), neodymium (Nd), titanium (Ti), iron (Fe), chromium (Cr), cobalt (Co), gold (Au), silver (Ag), and oxides, nitrides or oxynitrides thereof.

4. The decoration element of claim 1, further comprising a color film, wherein the color film is provided:
on a surface of the light absorbing layer, such that the light absorbing layer is between the color filter and the light reflective layer; or
between the light reflective layer and the light absorbing layer; or
on a surface of the light reflective layer, such that the light reflective layer is between the color filter and the light absorbing layer.

5. The decoration element of claim 4, further comprising a substrate, wherein the substrate is provided:
on a surface of the light reflective layer, wherein the color filter is provided between the light reflective layer and the light absorbing layer, or
on a surface of the light reflective layer, wherein the light absorbing layer is between the color filter and the light reflective layer, or
between the light reflective layer and the color filter, or
on a surface of the color filter, wherein the light reflective layer is between the color filter and the light absorbing layer.

6. The decoration element of claim 1, wherein the light absorbing layer comprises two or more points with differing thicknesses.

7. The decoration element of claim 1, wherein the light absorbing layer comprises at least one region in which an upper surface is inclined at an angle of greater than 0 degrees and less than or equal to 90 degrees, and the light absorbing layer comprises at least one region having a thickness different from a thickness in any one region having the inclined surface.

8. The decoration element of claim 1, wherein the light absorbing layer has dichroism of $\Delta E^*ab > 1$.

9. The decoration element of claim 1, wherein the pattern having protrusions in which the highest point has a line shape or grooves in which the lowest point has a line shape has only one shape when an upper surface of the protrusions is observed while rotating the pattern 360 degrees around a center of gravity of the upper surface.

10. The decoration element of claim 1, wherein the light absorbing layer has a refractive index of 0 to 8 at 400 nm.

11. The decoration element of claim 1, wherein the light absorbing layer has an extinction coefficient of greater than 0 and less than or equal to 4 at 400 nm.

12. The decoration element of claim 1, wherein the light absorbing layer is a single layer or a multilayer comprising one or more materials selected from: indium (In), titanium (Ti), tin (Sn), silicon (Si), germanium (Ge), aluminum (Al), copper (Cu), nickel (Ni), vanadium (V), tungsten (W), tantalum (Ta), molybdenum (Mo), neodymium (Nd), iron (Fe), chromium (Cr), cobalt (Co), gold (Au), silver (Ag), and oxides, nitrides or oxynitrides thereof.

13. The decoration element of claim 1, which is a deco film or a case of a mobile device.

* * * * *